(12) United States Patent
Frenkel

(10) Patent No.: US 7,814,009 B1
(45) Date of Patent: Oct. 12, 2010

(54) ANONYMOUS ON-LINE CASH MANAGEMENT SYSTEM

(76) Inventor: Marvin A. Frenkel, 26323 Hendrie Blvd., Huntington Woods, MI (US) 48070

( * ) Notice: Subject to any disclaimer, the term of this patent is extended or adjusted under 35 U.S.C. 154(b) by 0 days.

(21) Appl. No.: 09/979,570

(22) PCT Filed: May 12, 2000

(86) PCT No.: PCT/US00/13124
§ 371 (c)(1), (2), (4) Date: Nov. 26, 2002

(87) PCT Pub. No.: WO00/70487
PCT Pub. Date: Nov. 23, 2000

(51) Int. Cl.
*G06F 17/60* (2006.01)

(52) U.S. Cl. .............. 705/39; 705/35; 705/41; 705/26

(58) Field of Classification Search .......... 705/26, 705/1, 39, 44, 45; 382/115
See application file for complete search history.

(56) References Cited

U.S. PATENT DOCUMENTS

| | | | | |
|---|---|---|---|---|
| 5,420,926 A | * | 5/1995 | Low et al. | 705/74 |
| 5,455,407 A | | 10/1995 | Rosen | 235/380 |
| 5,485,520 A | | 1/1996 | Chaum et al. | 380/24 |
| 5,521,980 A | | 5/1996 | Brands | 380/30 |
| 5,557,518 A | * | 9/1996 | Rosen | 705/69 |
| 5,604,805 A | | 2/1997 | Brands | 380/30 |
| 5,606,617 A | | 2/1997 | Brands | 380/30 |
| 5,668,878 A | | 9/1997 | Brands | 380/30 |
| 5,696,827 A | | 12/1997 | Brands | 380/30 |
| 5,729,594 A | * | 3/1998 | Klingman | 379/93.12 |
| 5,745,886 A | | 4/1998 | Rosen | 705/39 |
| 5,768,385 A | * | 6/1998 | Simon | 705/69 |
| 5,802,497 A | | 9/1998 | Manasse | 705/27 |
| 5,812,670 A | * | 9/1998 | Micali | 705/74 |
| 5,832,089 A | | 11/1998 | Kravitz et al. | 380/24 |
| 5,878,138 A | | 3/1999 | Yacobi | 380/24 |
| 5,898,154 A | * | 4/1999 | Rosen | 235/379 |

(Continued)

FOREIGN PATENT DOCUMENTS

EP   0 391 261 A3   10/1990

(Continued)

OTHER PUBLICATIONS

Abstract, "InternetCash Corp. Chooses Sun Microsystems Storage and Servers to Enable Cash-Based Purchasing on the Web" PR Newswire (Jun. 19, 2000).

(Continued)

*Primary Examiner*—Evens J Augustin
(74) *Attorney, Agent, or Firm*—Harness, Dickey & Pierce P.L.C.

(57) ABSTRACT

A method for a customer to anonymously purchase goods or services from an on-line merchant, including the steps of depositing currency in the form of cash with a depository, the depository issuing to the customer one or more randomly-generated serial numbers, the customer submitting at least one serial number to the on-line merchant and the depository transferring an amount of said currency corresponding to said at least one serial number to an account of said on-line merchant. Since the customer uses cash for payment and the serial numbers are randomly-generated, the customer's identity remains anonymous.

12 Claims, 1 Drawing Sheet

U.S. PATENT DOCUMENTS

| | | | | |
|---|---|---|---|---|
| 5,901,229 | A | 5/1999 | Fujisaki et al. | 380/30 |
| 5,903,878 | A * | 5/1999 | Talati et al. | 705/26 |
| 5,903,880 | A | 5/1999 | Biffar | 705/39 |
| 5,903,882 | A * | 5/1999 | Asay et al. | 705/44 |
| 5,924,084 | A | 7/1999 | De Rooij | 705/39 |
| 6,006,200 | A * | 12/1999 | Boies et al. | 705/26 |
| 6,014,646 | A | 1/2000 | Vallee et al. | 705/39 |
| 6,148,091 | A * | 11/2000 | DiMaria | 382/115 |
| 6,196,460 | B1 * | 3/2001 | Shin | 235/380 |
| 6,236,981 | B1 * | 5/2001 | Hill | 705/67 |
| 6,260,024 | B1 * | 7/2001 | Shkedy | 705/37 |
| 6,314,409 | B2 * | 11/2001 | Schneck et al. | 705/54 |
| 6,404,869 | B1 * | 6/2002 | Henderson et al. | 379/144.01 |
| 6,467,684 | B2 * | 10/2002 | Fite et al. | 235/379 |
| 6,505,171 | B1 * | 1/2003 | Cohen et al. | 705/26 |
| 6,529,884 | B1 * | 3/2003 | Jakobsson | 705/64 |
| 6,609,113 | B1 * | 8/2003 | O'Leary et al. | 705/39 |
| 6,748,365 | B1 * | 6/2004 | Quinlan et al. | 705/14 |
| 6,748,366 | B1 * | 6/2004 | Hurwitz et al. | 705/53 |
| 6,807,530 | B1 * | 10/2004 | Shub et al. | 705/1 |
| 6,823,318 | B1 * | 11/2004 | Creswell et al. | 705/26 |
| 6,918,537 | B2 * | 7/2005 | Graves et al. | 235/379 |
| 7,010,512 | B1 * | 3/2006 | Gillin et al. | 705/39 |
| 7,054,838 | B2 * | 5/2006 | Sutton et al. | 705/35 |
| 7,134,594 | B2 * | 11/2006 | Thompson et al. | 235/380 |
| 7,191,939 | B2 * | 3/2007 | Beck et al. | 235/380 |
| 7,204,412 | B2 * | 4/2007 | Foss, Jr. | 235/380 |
| 7,575,152 | B2 * | 8/2009 | Graves et al. | 235/378 |
| 2001/0021926 | A1 * | 9/2001 | Schneck et al. | 705/54 |
| 2001/0023415 | A1 * | 9/2001 | Keil | 705/44 |
| 2001/0042784 | A1 * | 11/2001 | Fite et al. | 235/379 |
| 2002/0016763 | A1 * | 2/2002 | March | 705/39 |
| 2002/0046341 | A1 * | 4/2002 | Kazaks et al. | 713/182 |
| 2002/0069166 | A1 * | 6/2002 | Moreau et al. | 705/40 |
| 2002/0083008 | A1 * | 6/2002 | Smith et al. | 705/64 |
| 2002/0161716 | A1 * | 10/2002 | Iwamura | 705/59 |
| 2003/0200179 | A1 * | 10/2003 | Kwan | 705/65 |

FOREIGN PATENT DOCUMENTS

| | | |
|---|---|---|
| EP | 0 542 298 A2 | 5/1993 |

OTHER PUBLICATIONS

Abstract, Kenneth Li, "E-commerce for Debtors. (from SpendCash. com) (Company Business and Marketing)" Network World (Sep. 27, 1999).

"The Two Approaches to Electronic Money" from www.providence.edu.

Steven H. Low et al., "Anonymous Credit Cards and its Collusion Analysis" (Oct. 10, 1994).

Steven H. Low et al., "Anonymous Credit Cards" Proceedings of the 2nd ACM Conference on Computer and Communication Security, Fairfax, Virginia, USA (Nov. 2-4, 1994).

David M. Kristol et al., "Anonymous Internet Mercantile Protocol" (Mar. 17, 1994).

Printouts re: eCash Technologies, Inc. from www.digicash.com (2000).

"Zero-Knowledge to Develop Anonymous Electronic Cash" from www.flashcommerce.com.

Printouts re: Freedom from www.freedom.net.

"A Bibliography of Electronic Payment Information" from robotics.stanford.edu.

"Electronic Cash" from www.cs.sandia.gov (Jan. 18, 1995).

Printouts from www.cybercash.com.

Printout re: DigiCash from hyperwave.fast.de.

* cited by examiner

ANONYMOUS ON-LINE CASH MANAGEMENT SYSTEM

BACKGROUND OF THE INVENTION

1. Field of the Invention

The present invention generally relates to an on-line cash transfer system. More particularly, the present invention relates to a system for purchasing goods and/or services wherein the source of the funds utilized for the on-line purchase is anonymous and cannot be directly traced to the owner of the funds.

2. Description of Related Art

Commerce executed on the Internet or on-line is exponentially increasing day by day. However, it is speculated that commerce conducted via the Internet or on-line is in its infancy and will grow substantially larger in coming years.

Much of the apprehension or reluctance of on-line users to make purchases via the Internet is the fear or concern associated with providing credit card or other personal information (e.g., names, numbers, expiration dates, etc.) over the Internet. Further, many on-line purchasers are concerned about the establishment of a paper record documenting the goods and/or services that they purchase. Although most on-line providers of goods and/or services offer secured means for obtaining their products, a large section of the on-line using public remains apprehensive to provide such information and make purchases in this manner.

One prior art method of anonymous electronic cash management is disclosed in U.S. Pat. No. 6,014,646 that issued Jan. 11, 2000 to Vallee et al. Vallee et al. discloses a payment method whereby a customer withdraws from his or her bank a sum in the form of "blind" electronic coins or cash and deposits the latter in one or more anonymous accounts located in a kiosk. The customer may then use the account or accounts for paying suppliers of goods or services. Accordingly, a supplier obtains the guarantee of being paid and the customer remains anonymous in the sense that his identity is not linked with his or her payments.

A second anonymous on-line cash management method was disclosed by the DigiCash Corp. In the Digicash method, a consumer deposits funds in an on-line account by mailing a credit card voucher of a check to an on-line bank. E-cash tokens are then exchanged for traditional currency and a requested amount of electronic money is transferred from an on-line bank account to the consumer's computer hard drive. The consumer may then use their account numbers to electronically purchase goods and services. Following the purchase transaction, the on-line merchant that receives the e-cash token may redeem them at an on-line bank account.

While each of the above methods appears to disclose an anonymous means of funds transfer, a close review indicates that in each case some form of document (i.e., a paper trail) is created that would facilitate tracking or monitoring of the entire transaction. Accordingly, there exists a need for a new method of assisting the anonymous on-line purchase of goods and/or services that eliminates the drawbacks and apprehensions produced by the current method of conducting on-line purchases.

BRIEF SUMMARY OF THE INVENTION

The present invention provides a system for facilitating the anonymous transfer of funds between an on-line customer of Internet or on-line goods and/or services and an on-line merchant of those goods and/or services. In the system of the present invention, a third party ("a Depository"), such as a corporation or bank, establishes a bank or reserve wherein a potential on-line customer opens an account by handing the Depository monies in the form of cash.

Funds transferred to the Depository are converted into an electronic or on-line form of currency and placed in a numbered account. The Depository then issues the potential on-line customer a serial number corresponding to the account number set up with the Depository. The account has a fixed amount corresponding to the funds given to the Depository by the customer. For example, if the customer provides the Depository with five twenty dollar bills ($100.00), the customer may request five account numbers each having an assigned value of twenty dollars. Notably, because the customer's transaction with the Depository preferably involves a direct cash transfer, no record of the customer's identity exists or is created. Upon receipt of the account numbers, the customer may now begin to shop on-line for goods and services.

Upon locating a merchant offering desirable on-line goods or services, the customer orders said goods or services and transmits an account number(s) to the on-line merchant. After receiving the account number(s) from the customer, the merchant transmits the account number to the Depository for authentication. Following authentication of the account number, an amount corresponding to the account number is transmitted into a bank account of the on-line merchant and the transaction with the customer is completed.

BRIEF DESCRIPTION OF THE SEVERAL VIEWS OF THE DRAWINGS

Reference will now be had to the attached drawings wherein like reference numerals refer to like parts throughout the specification.

DETAILED DESCRIPTION OF THE INVENTION

Figure 1:
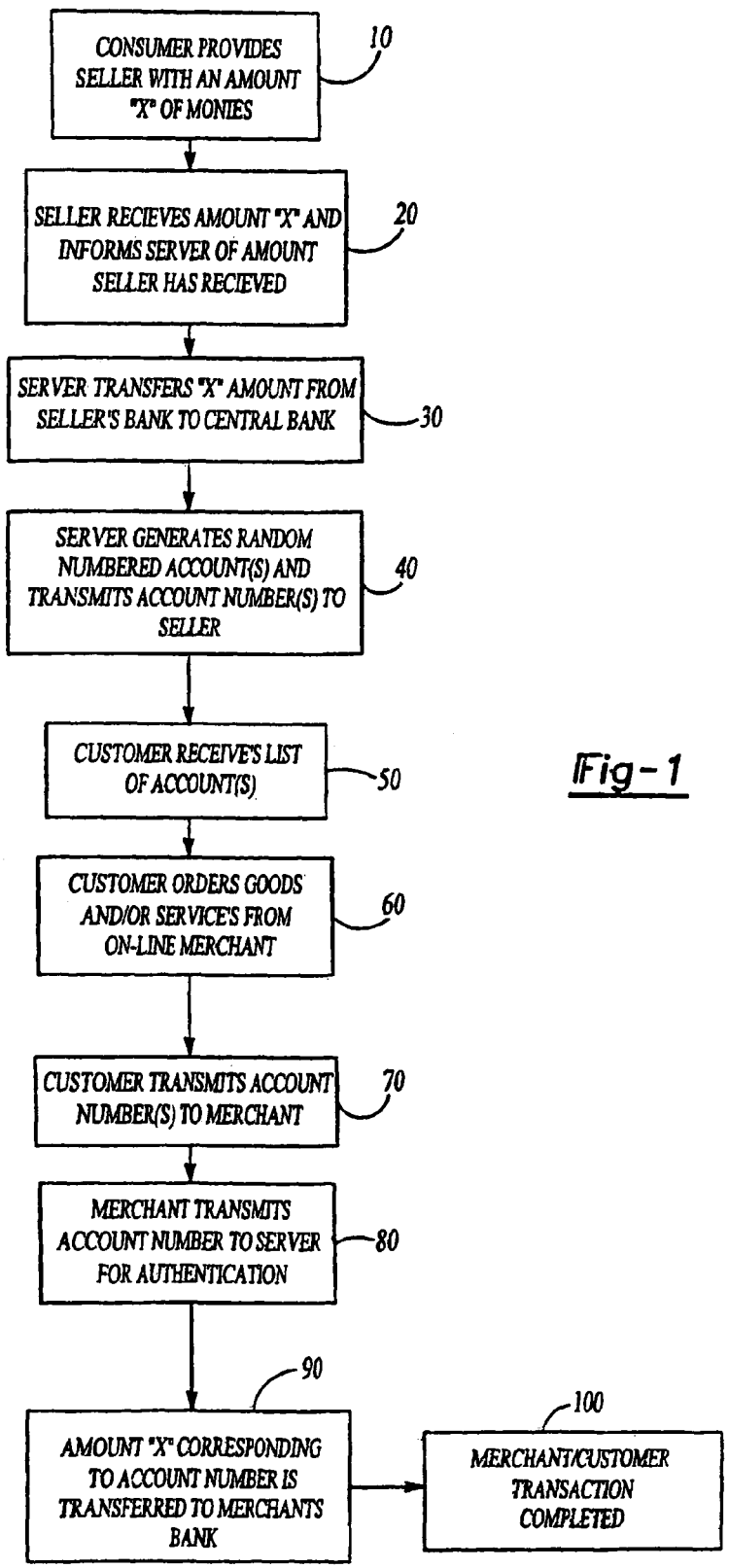
FIG. 1 is a flow chart of a preferred embodiment of the present invention.

The present invention provides a system for facilitating the anonymous transfer of funds between an on-line customer of Internet or on-line goods and/or services and an on-line merchant of those goods and/or services. In the system of the present invention, a third party (a "Depository"), such as a corporation or bank, establishes a depository wherein a potential on-line customer opens an account by handing the Depository monies in the form of cash. The Depository may include a plurality of components such as central computer Server, bank(s), retail establishments and the like. Alternatively, the Depository includes a device similar to automatic teller machine (ATM) that a customer can use cash or a credit card to convert funds into anonymous currency having a serial number associated therewith.

The Depository components are interlinked over a secured private computer network. Alternatively, a public network, such as the Internet and other examples well known in the art may also be used.

Funds transferred to the Depository by the customer are converted into an electronic or on-line form of currency and placed in a numbered account. The Depository then issues the potential on-line customer a serial number corresponding to the account number set up with the Depository. The account has a fixed amount corresponding to the value of funds given to the Depository by the customer. Therefore, as will be described below, an on-line merchant is prevented from charging an amount in excess of the amount used to set up the account. The serial number could be the same number as the account number but does not necessarily have to be the same.

The conversion of funds into serial numbers according to the present invention also provides a method to prevent underage on-line or Internet users from accessing particular websites. Specifically, the Depository may demand proof of age from the customer and, if the customer's age was less than, for example, the age of majority, the Depository could issue the customer serial numbers indicative of an underaged user (status). These age indicative serial numbers are identifiable by on-line or Internet merchants to prevent access to a website or decline a purchase. Alternatively, the Depository could simply refuse to convert the funds of an underaged customer.

The Depository preferably generates large quantities of unique serial numbers such that the serial numbers are used and discarded by the customers. Since the serial numbers are preferably never used again, it is very difficult for serial numbers to be fraudulently obtained and/or used.

The Depository charges the customer a fee for its service in generating the account numbers and managing any subsequent on-line purchases. For example, a fee may be charged for setting up the account, for each transaction conducted using the account, a flat rate for the amount of funds converted into the on-line form of currency, or any combination thereof.

Upon receipt of the serial numbers, the customer contacts an on-line merchant via the Internet or similar electronic network from which they wish to purchase goods and/or services. The customer subsequently places their order with the on-line merchant and pays for the goods and/or services by providing to the merchant their serial number with the Depository.

Following receipt of the serial number from the merchant, the Depository transfers the on-line funds to the on-line merchant in satisfaction of the sale consummated between the customer and the merchant. Accordingly, no one, with the exception of the customer, would have access to any information regarding the source of the funds used for the on-line purchase. Therefore, unlike credit card purchases, there would be no record regarding the nature or the amount of on-line purchases made by the customer. This type of funds transferring system would be especially useful for those individuals desirous of purchasing, for example, adult type goods and/or services via the Internet thereby preserving the customer's right to privacy.

Once the funds transferred into the account with the Depository have been exhausted, the account could then be allowed to simply expire. Alternatively, the account could remain open for future use.

As seen in FIG. 1, there is shown a preferred embodiment of the system of the present invention. In the preferred embodiment the Depositary comprises a plurality of elements including: an account Seller and the Seller's bank; a central bank, and; a computer Server that transfers the necessary amounts from the various accounts and generates the requisite account serial numbers. The various Depositary components preferably communicate via a secured private computer network. Alternatively, a public network, such as the Internet, may be used.

In a first step 10, a customer provides an account Seller with an amount of money "X". Preferably, the money provided to the Seller is in the form of cash. Credit cards and other forms of monetary transfer may also be utilized but are disfavored as these types of transactions are easily documented. The Seller is preferably a retail store such as a corner drugstore or shopping mall establishment. However, any establishment having a computer terminal and the capability to access the network may operate as a Seller.

In the next step 20, upon receipt of monies from the customer the Seller electronically notifies a central computer Server of the amount Seller has received from the customer. In the next step 30, the Server transfers an amount of money (corresponding to the amount "X" that Seller received from the customer) from a bank account of Seller to a central bank account.

Following the transfer of funds, in the next step 40, the Server generates a series of random account numbers and assigns to each account number an amount requested by the customer. For example, if the customer provides a Seller with five twenty dollar bills ($100.00), the customer may request five account numbers each have an assigned value of twenty dollars. In the next step 50, the Server electronically transmits the account number(s) with corresponding monetary amounts to the Seller who, in the next step 60, provides the customer with the account information.

Preferably, the seller Depository provides the customer with a computer readable (CD-ROM, floppy disk, etc.) output/form which includes all of their serial numbers disposed thereon. Alternatively, the customer is provided with a printout of his or her account numbers. A computer readable format for the serial numbers eliminates the need for the customer to personally key in potentially large serial numbers, thus eliminating any possibility for customer/user error. Additionally, the provision of a computer readable form such as a disk to the customer provides an additional point of revenue for the Depository. For example, the Depository may offer the opportunity to place advertising or other additional information on disk, etc. provided to the customer and charge a fee to a potential advertiser.

The customer may now begin to shop on-line for goods and services. After locating a merchant offering desirable on-line goods or services, the customer takes the next step 70 and orders said goods or services and transmits an account number(s) to the on-line merchant. Upon receipt of the account number(s), in the next step 80, the merchant transmits the account number(s) to the Server for authentication. Following authentication of the account number, in the next step 90, an amount of monies contained in the numbered account number (but in no case greater than the amount of monies contained in the account) are transmitted, in step 100, into a bank account of the on-line merchant and the transaction with the customer is completed.

Therefore, unlike credit card purchases, there would be no record regarding the nature or the amount of purchases made by the customer. The present system would be especially useful for those individuals desirous of purchasing, for example, adult type goods and/or services via the Internet thereby preserving the customer's privacy.

Having described my invention, those skilled in the art will be aware of other additional embodiments that do not depart from the scope of the invention and the appended claims.

I claim:

1. A method for a customer to anonymously purchase goods or services from an on-line merchant, said method comprising the steps of:

a customer depositing an amount of cash with an account seller, the account seller being independent of said customer such that the identity of said customer remains anonymous;

the account seller electronically notifying a central computer server of the amount of cash received from the customer;

the central computer server transferring an amount of electronic currency corresponding to the amount that the account seller received from the customer from a bank account of the account seller to a central bank account having one or more account numbers;

the central computer server generating, storing and issuing to the account seller one or more anonymous and randomly-generated serial numbers corresponding to said one or more account numbers;

the account seller providing the serial number information to the customer;

the customer submitting at least one serial number to the on-line merchant to purchase goods or services, said on-line merchant being unable to identify said customer during said purchase;

the on-line merchant, upon receipt of said at least one serial number submitted by said customer, transmitting said at least one serial number to the central computer server for authentication;

the central computer server authenticating said at least one serial number; and the central computer server transferring an amount of said electronic currency corresponding to said at least one serial number to an account of said on-line merchant.

2. A method according to claim 1, wherein the step of the account seller providing the serial number information to the customer comprises the account seller providing the customer with a computer readable form having said at least one serial number corresponding to the amount of cash deposited therewith disposed thereon.

3. A method according to claim 1, wherein the account seller is selected from the group consisting of retail stores and banks.

4. A method according to claim 1, wherein the customer deposits an amount of cash with the account seller through an automatic teller machine.

5. A method according to claim 1, wherein the step of the account seller providing the serial number information to the customer comprises the account seller providing the customer with a paper having said at least one serial number corresponding to the amount of cash deposited therewith disposed thereon.

6. A method according to claim 1, wherein the account seller, the bank account of the account seller, the central computer server and the central bank are interlinked by a secured private computer network.

7. A method according to claim 1, wherein the account seller, the bank account of the account seller, the central computer server and the central bank communicate over the Internet.

8. A method according to claim 1, wherein the serial numbers are the same as the account numbers.

9. A method according to claim 1, wherein the serial numbers are used once, discarded by customers thereafter and never used again.

10. A system for anonymously transferring funds electronically between a customer and an on-line merchant comprising:

an account seller capable of receiving cash from a customer;

a central computer server capable of receiving notification from the account seller of the amount of cash received from the customer, transferring an amount of electronic currency corresponding to the amount that the account seller received from the customer from a bank account of the account seller to a central bank account, generating one or more random account numbers corresponding to said central bank account, storing said one or more account numbers, transmitting said one or more account numbers to said account seller, and authenticating said one or more account numbers when presented by an on-line merchant; and a computer network capable of communicating between said account seller, said central computer server, said bank account of the account seller and said central bank.

11. The system according to claim 10 wherein said computer network is a secured private computer network.

12. The system according to claim 10 wherein said computer network is the Internet.

* * * * *